US006751198B1

(12) United States Patent
McPherson et al.

(10) Patent No.: US 6,751,198 B1
(45) Date of Patent: Jun. 15, 2004

(54) SYSTEM AND METHOD FOR MEASURING ROUND TRIP DELAY OF VOICE PACKETS IN A TELEPHONE SYSTEM

(75) Inventors: Ian B. McPherson, Belleville (CA); Thornton L. Collins, Stirling (CA); Andre M. Cyr, Belleville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/472,149

(22) Filed: Dec. 27, 1999

(51) Int. Cl.[7] ............................ H04J 1/16; H04L 12/26
(52) U.S. Cl. ........................ 370/252; 370/352; 370/356
(58) Field of Search ................................ 370/352–356, 370/420, 421, 252, 253, 394

(56) References Cited

U.S. PATENT DOCUMENTS 4,569,042 A * 2/1986 Larson ...................... 370/250
6,320,867 B1 * 11/2001 Bellenger et al. ........... 370/420

* cited by examiner

*Primary Examiner*—Wellington Chin
*Assistant Examiner*—Raj Jain
(74) *Attorney, Agent, or Firm*—Kevin L. Smith

(57) ABSTRACT

Systems and methods measure a round trip delay of voice packets through a telephone system that includes a plurality of cabinets connected through a network. Each cabinet includes a link for communicating with other cabinets through the network by passing information such as voice packets. Each link includes a field programmable gate array (FPGA) that inserts and reads information in the voice packets to measure a time delay of the network. A first cabinet link sets a transmit bit in a voice packet directed to a second cabinet and starts a timer. The second cabinet monitors the transmit bit in received voice packets to determine if the bit is set. If so, the second cabinet sets a receive bit in the next outgoing voice packet directed to the first cabinet. The first cabinet monitors the receive bit in incoming voice packets and if set, stops the timer. The resulting value in the timer reflects the network delay.

36 Claims, 7 Drawing Sheets

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 1 | MAC DESTINATION ADDRESS | | | | | | | | | | | | | | | | | | | | | | | | | | | | | | | |
| 2 | MAC DESTINATION ADDRESS | | | | | | | | | | | | | | | | MAC SOURCE ADDRESS | | | | | | | | | | | | | | | |
| 3 | MAC SOURCE ADDRESS | | | | | | | | | | | | | | | | | | | | | | | | | | | | | | | |
| 4 | ETHER TYPE | | | | | | | | | | | | | | | | VERSION | | | | HEADER LGTH | | | | TYPE OF SERVICE | | | | | | | |
| 5 | TOTAL LENGTH=IP HEADER+UDP/TCP HEADER+DATA (BYTES) | | | | | | | | | | | | | | | | IDENTIFICATION | | | | | | | | | | | | | | | |
| 6 | 0 | | | FRAGMENT OFFSET | | | | | | | | | | | | | TIME TO LIVE | | | | | | | | PROTOCOL | | | | | | | |
| 7 | HEADER CHECKSUM | | | | | | | | | | | | | | | | IP SOURCE ADDRESS | | | | | | | | | | | | | | | |
| 8 | IP SOURCE ADDRESS | | | | | | | | | | | | | | | | IP DESTINATION ADDRESS | | | | | | | | | | | | | | | |
| 9 | IP DESTINATION ADDRESS | | | | | | | | | | | | | | | | UDP/TCP SOURCE PORT # | | | | | | | | | | | | | | | |
| A | UDP/TCP DESTINATION PORT # | | | | | | | | | | | | | | | | LENGTH=UDP HEADER+DATA (BYTES) | | | | | | | | | | | | | | | |
| B | CHECKSUM | | | | | | | | | | | | | | | | CT | CR | SEQUENCE # | | | | | | | | | | | | | |
| C | IVD CHANNEL 0 | | | | | | | | IVD CHANNEL 1 | | | | | | | | IVD CHANNEL 2 | | | | | | | | IVD CHANNEL 3 | | | | | | | |
| D | IVD CHANNEL 4 | | | | | | | | IVD CHANNEL 5 | | | | | | | | IVD CHANNEL 6 | | | | | | | | IVD CHANNEL 7 | | | | | | | |
| E | IVD CHANNEL 8 | | | | | | | | IVD CHANNEL 9 | | | | | | | | IVD CHANNEL 10 | | | | | | | | IVD CHANNEL 11 | | | | | | | |
| F | IVD CHANNEL 12 | | | | | | | | IVD CHANNEL 13 | | | | | | | | IVD CHANNEL 14 | | | | | | | | IVD CHANNEL 15 | | | | | | | |

220 (CT)

230 (CR)

SYSTEM AND METHOD FOR MEASURING ROUND TRIP DELAY OF VOICE PACKETS IN A TELEPHONE SYSTEM

BACKGROUND OF THE INVENTION

1. Field of the Invention

This invention generally relates to telephone networks, and, more particularly, to a system and method for measuring a round trip time delay of voice packets in a telephone network.

2. Description of the Related Art

Typically, telephone systems for private organizations are set up as private branch exchanges (PBX). PBX sites allow for a plurality of telephones to share a set of lines for communicating between the telephones at the site and external telephones. Each telephone is connected to a cabinet. A cabinet is a physical box holding the wires, hardware, and software needed to forward information to and from the telephones.

Most cabinets at PBX sites are connected through physical means, such as fiber optic, connections. This requires many physical connectors be in place. It is preferable to use a local area network (LAN) to connect cabinets at a PBX site because typically all the users associated with that PBX already have a LAN connecting them. One problem with using a LAN is the delays created can distort the voices.

Software measurements of the delay are not accurate because they use an upper layer software protocol, and the coarse granularity software-based timers provides measurements that are sometimes an order of magnitude greater than the actual delays introduced by the network.

It would be desirable to measure delays caused by the LAN so that a customer may be notified of delay problems before the telephone system deteriorates and voices are transmitted distorted. It would also be desirable to know the delay so that if voices are distorted the customer knows that it is the LAN causing the distortion.

SUMMARY OF THE INVENTION

Systems and methods consistent with the present invention include structure and steps for measuring a round trip delay of voice packets in a telephone network.

A system for use in a telephone network consistent with the present invention comprises structure for setting a transmit bit in an outgoing packet and for starting a timer at the setting of the transmit bit and structure for reading a receive bit in a received packet and for stopping the timer in response to the reading of a set receive bit in the received packet.

A system and method consistent with the present invention include structure and steps for constructing an outgoing first voice packet, setting a transmit bit in the first voice packet, starting a timer upon the setting of the transmit bit. In one embodiment the systems and methods consistent with the present invention further include structure and steps for receiving a second voice packet, checking the second voice packet to determine if a receive bit is set, and stopping the timer if the receive bit is set.

Another system consistent with the present invention includes a timer, a transmitting protocol state machine and a receiving protocol state machine. The transmitting protocol state machine comprising structure for assembling a first voice packet from voice samples, the first voice packet including a receive bit and a transmit bit, structure for setting the transmit bit in the first voice packet, structure for starting the timer upon the setting of the transmit bit, and structure for transmitting the first voice packet. The receiving protocol state machine comprising structure for receiving a second voice packet, the second voice packet including a receive bit and a transmit bit, structure for reading the receive bit and the transmit bit in the second voice packet, structure for setting the receive bit on the first voice packet assembled by the transmitting protocol state machine in response to reading a set transmit bit in the second voice packet, and structure for stopping the timer in response to reading a set receive bit.

Another system consistent with the present invention includes a cabinet for use in a telephone network transmitting packets, the cabinet comprising a link for communicating with external devices and structure for connecting to a set of telephones. The link includes structure for setting a transmit bit in an outgoing packet and for starting a timer at the setting of the transmit bit and structure for reading a receive bit in a received packet and for stopping the timer in response to the reading of a set receive bit in the received packet.

Both the foregoing general description and the following detailed description explain examples of the invention and do not, by themselves, restrict the scope of the appended claims.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings,

FIG. 2 shows a voice packet consistent with the present invention;

DETAILED DESCRIPTION

Figure 1:
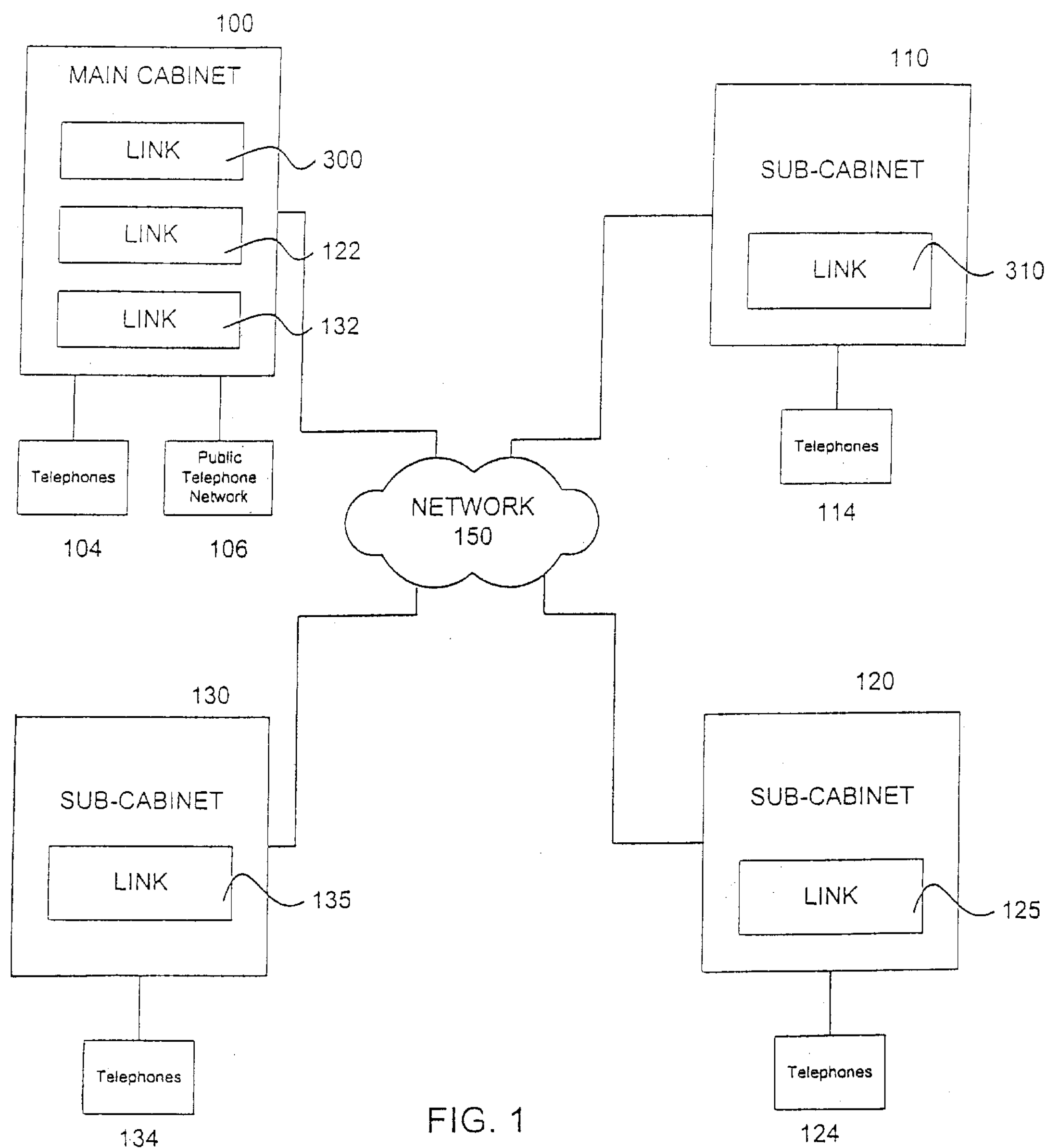
FIG. 1 shows a PBX telephone system consistent with the present invention.

Reference will now be made in detail to the construction and operation of implementations, consistent with the present invention, that are illustrated in the accompanying drawings. In those drawings, like elements and operations are designated with the same reference numerals where possible.

Systems consistent with the present invention provide a telephone system that measures a round trip delay of voice packets through a network as a measure of the telephone system's quality. In one implementation, the telephone system includes a network of cabinets, each including a link for communicating with other cabinets through the network by passing information such as voice packets. Each link includes a field programmable gate array (FPGA) that inserts information into and reads information from the voice packets to measure a time delay of the network. A first cabinet link sets a transmit bit in a voice packet directed to a second cabinet and starts a timer. The second cabinet monitors the transmit bit in received voice packets to determine if the bit is set. If so, the second cabinet sets a receive bit in the next outgoing voice packet directed to the first cabinet. The first cabinet monitors the receive bit in incoming voice packets and, if set, stops the timer. The resulting value in the timer reflects the network delay. If this number is greater than a predetermined value, the cabinet notifies a user through an attached terminal. Both the main cabinet and sub-cabinets can perform the functions of the first and second cabinet.

FIG. 1 shows a PBX telephone system consistent with the present invention. Every telephone in the PBX system is associated with a cabinet. Each telephone has a physical line going from the telephone to an assigned cabinet. There is only one main cabinet and a plurality of sub-cabinets. All communications from telephones at the sub-cabinets are directed through the main cabinet.

Referring to FIG. 1, main cabinet 100 includes a link dedicated to every sub-cabinet in the telephone system. For example link 300 in main cabinet 100 communicates only with link 310 in sub-cabinet 110. Similarly, main cabinet link 122 communicates with link 125 in sub-cabinet 120, and main cabinet link 132 communicates with link 135 in sub-cabinet 130. The links pass information through network 150, which can be a local area network. The links form and pass voice packets between the cabinets during a call.

Each cabinet 100, 110, 120, and 130 has associated telephones 104, 114, 124, and 134, respectively. The main cabinet also has access to the public switched telephone network 106. All calls are directed through the main cabinet. Therefore, telephone calls associated with any sub-cabinet directed to the public switched network 106 are connected via the main cabinet 100. Similarly, any call directed to any other telephone is directed to the main cabinet even if the telephone to receive the call is at the same cabinet as the calling telephone.

FIG. 2 shows an example voice packet 200 including a destination address 210 that identifies which cabinet the packet is being directed to, along with other standard information. Voice packet 200 further includes continuity transmit (CT) bit 220 and continuity receive (CR) bit 230 that allow for timing the delay of voice packet transmission in a network consistent with the present invention.

Figure 3:
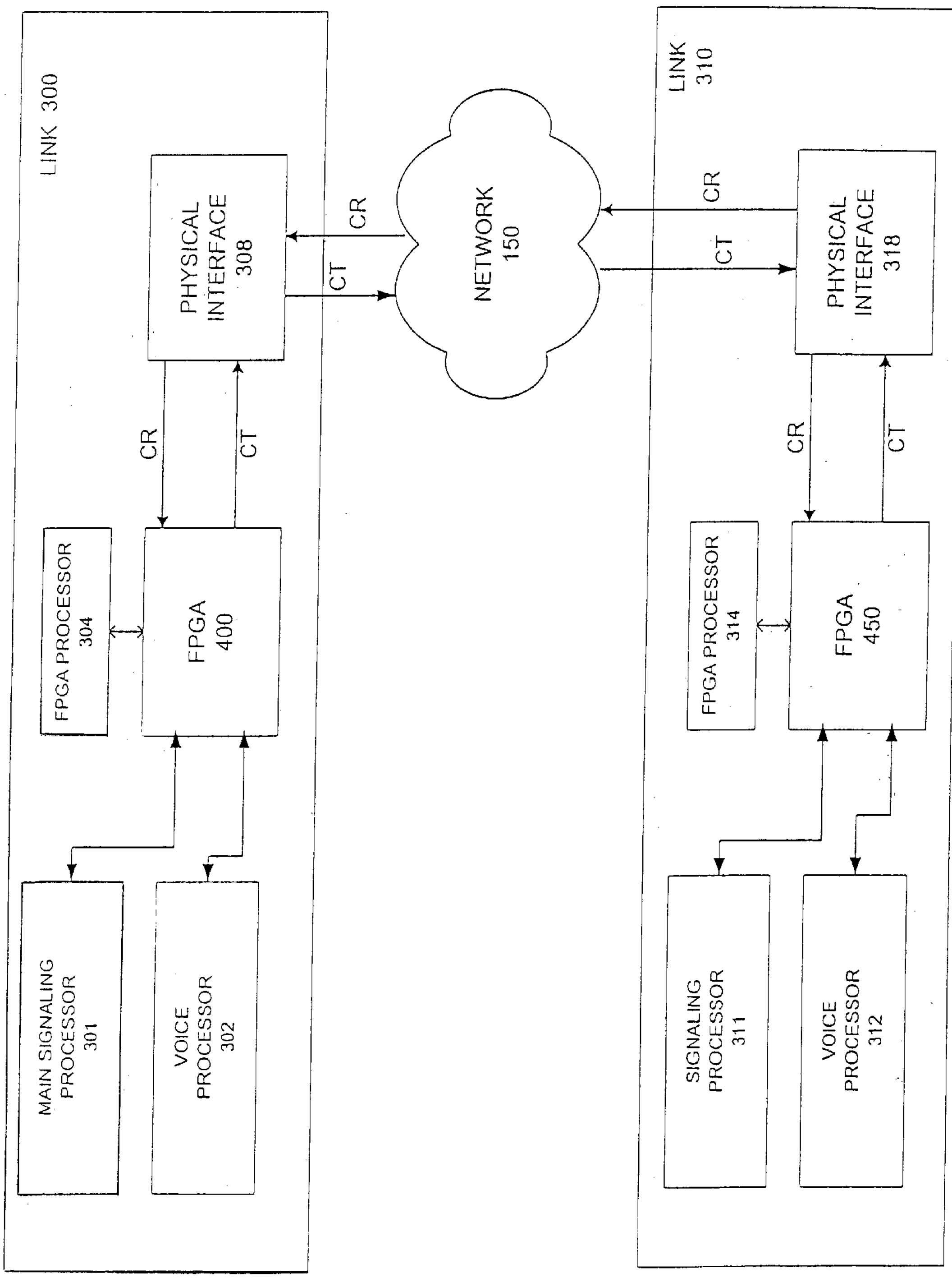
FIG. 3 shows a pair of links from the cabinets of FIG. 1 and the connections between links consistent with the present invention.

FIG. 3 shows a pair of links from the cabinets of FIG. 1 and the connections between these links consistent with the present invention. In particular, FIG. 3 shows link 300 located in main cabinet 100 and link 310 located in sub-cabinet 110. As mentioned above, link 300 is dedicated to communication with link 310 via network 150. The like-named elements of links 300 and 310 perform the same functions.

Link 300 includes main signaling processor 301 for processing telephone calls according to industry standards. The main signaling processor 301 preferably includes the intelligence to direct all telephone calls in the system. As discussed above, all calls pass through the main cabinet. The signaling processor 311 in link 310 does not have the intelligence of the main signaling processor 301. Signaling processor 311 packages signals from telephones associated with sub-cabinet 110 for forwarding to main cabinet 100 for deciphering. These signals include tones generated by hitting keys on a telephone. Using this information, the main signaling processor 301 at the main cabinet 100 can determine to which telephone a call is directed.

Voice processor 302 in link 300 gathers pulse code modulation (PCM) voice samples from telephones associated with main cabinet 100 and forwards the samples to field programmable gate array (FPGA) 400 for packaging. FPGA 400 packages the voice samples into voice packets that follow an internet protocol in an industry standard manner using FPGA processor 304. FPGA 400 also sets and reviews the CR and CT bits in the voice packet in order to measure a delay of the network consistent with the present invention. FPGA 400 passes the voice packets to the physical interface 308, which turns the signals into voltage for placing over a wire to the network 150. Network 150 then passes the communication to link 310. Using this example, the communication is received by physical interface 318 at link 310. Physical interface 318 converts the voltage to a voice packet and forwards the same to FPGA 450. FPGA 450 processes the voice packet and reviews the CT and CR bits in order to monitor a delay time of the network as required by the present invention. FPGA 450 converts the voice packet into voice samples before forwarding to voice processor 312 which then forwards the communication to the appropriate telephone.

In one embodiment, the signaling processor is a Motorola MC68040 CPU. In another, embodiment the physical interface is a SEEQ 80C300+LXT970.

Figure 4:
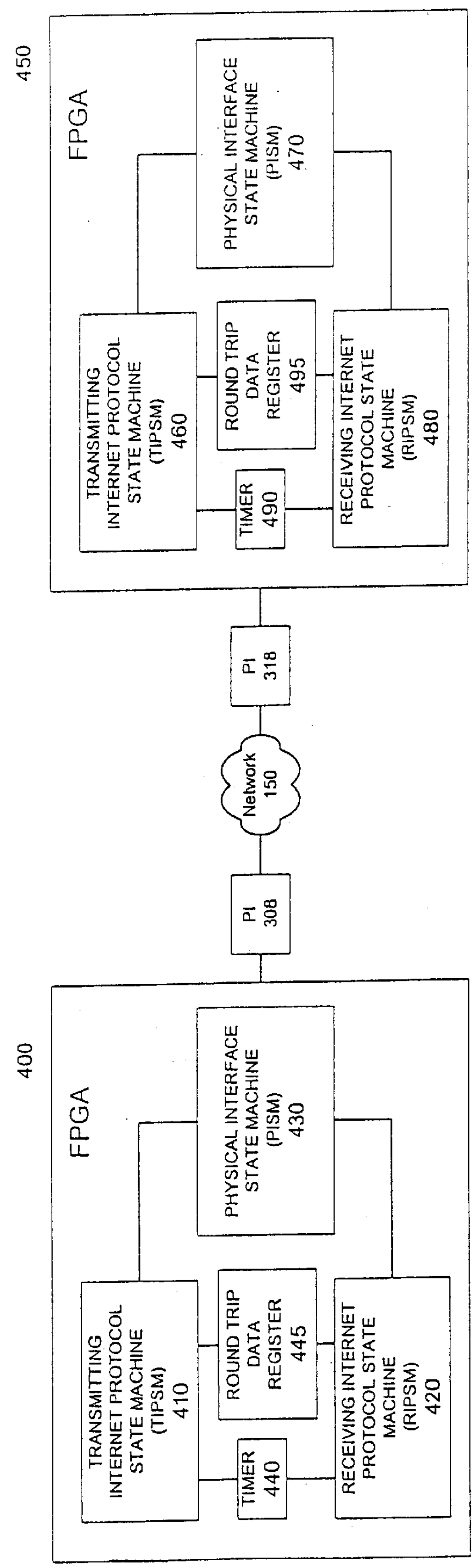
FIG. 4 shows the pair of FPGAs from FIG. 3 consistent with the present invention.

FIG. 4 shows the FPGAs of FIG. 3 and corresponding connections consistent with the present invention. The elements in FPGA 400 and 450 perform the same functions. FPGA 400 includes a transmitting internet protocol state machine (TIPSM) 410, a receiving internet protocol state machine (RIPSM) 420, a physical interface state machine (PISM) 430, a timer 440 and a round trip data register 445. Similarly, FPGA 450 includes a transmitting internet protocol state machine (TIPSM) 460, a receiving internet protocol state machine (RIPSM) 480, a physical interface state machine (PISM) 470, a timer 490 and a round trip data register 495.

PISM 430 controls the transmission and reception of data from the physical interface 308. PISM 430 monitors physical interface 308 to see when data is available to be received, and when ready passes the data from physical interface 308 to RIPSM 420. TIPSM 410 converts voice samples into voice packets that follow an internet protocol and then sends the voice packets to PISM 430 for transmission over network 150. PISM 430 monitors physical interface 308 to determine when physical interface 308 is ready to receive data, and when ready passes the data to physical interface 308 for transmission over network 150. RIPSM 420 converts voice packets that follow an internet protocol into voice samples for forwarding to telephones.

The operation of the elements in FIG. 4 will be further explained with reference to FIGS. 5–7 discussed below.

Figure 5:
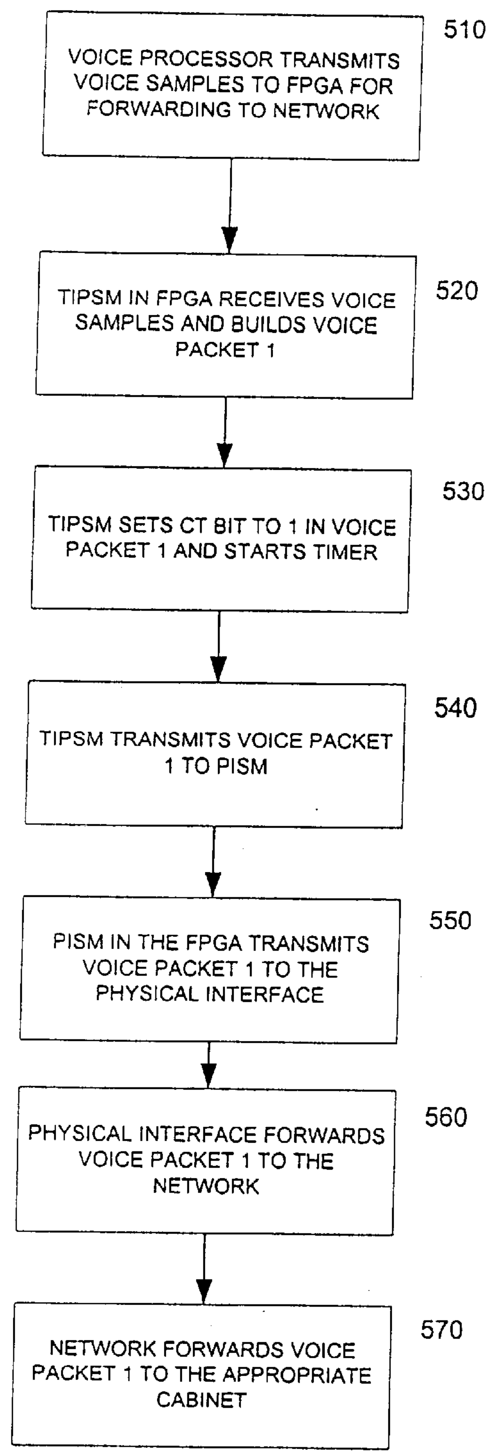
FIG. 5 shows the steps performed by a first cabinet and a network to initiate timing of the round trip delay of a voice packet consistent with the present invention.
Figure 6:
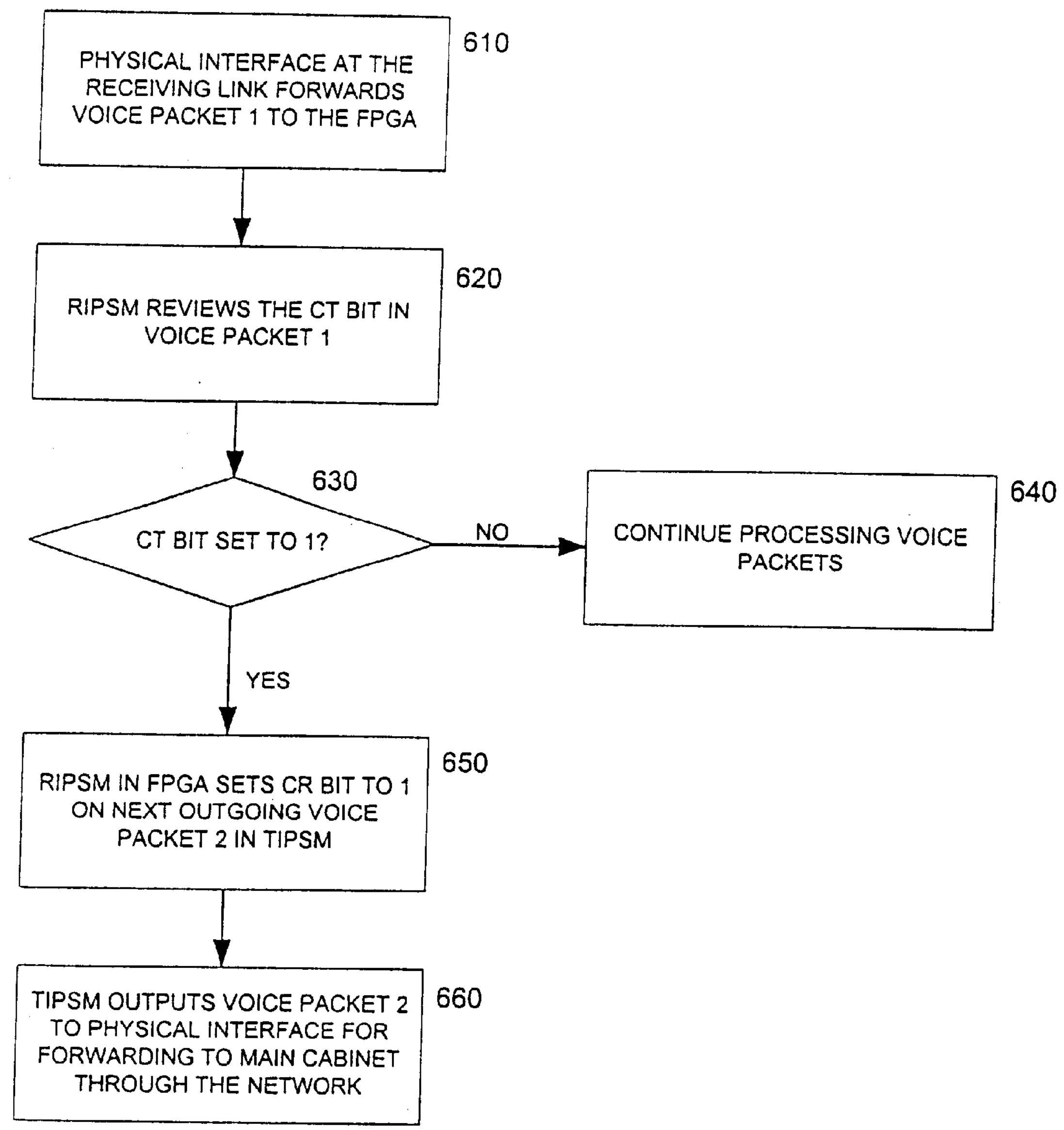
FIG. 6 shows the steps performed by a second cabinet to facilitate timing of the round trip delay of a voice packet.
Figure 7:
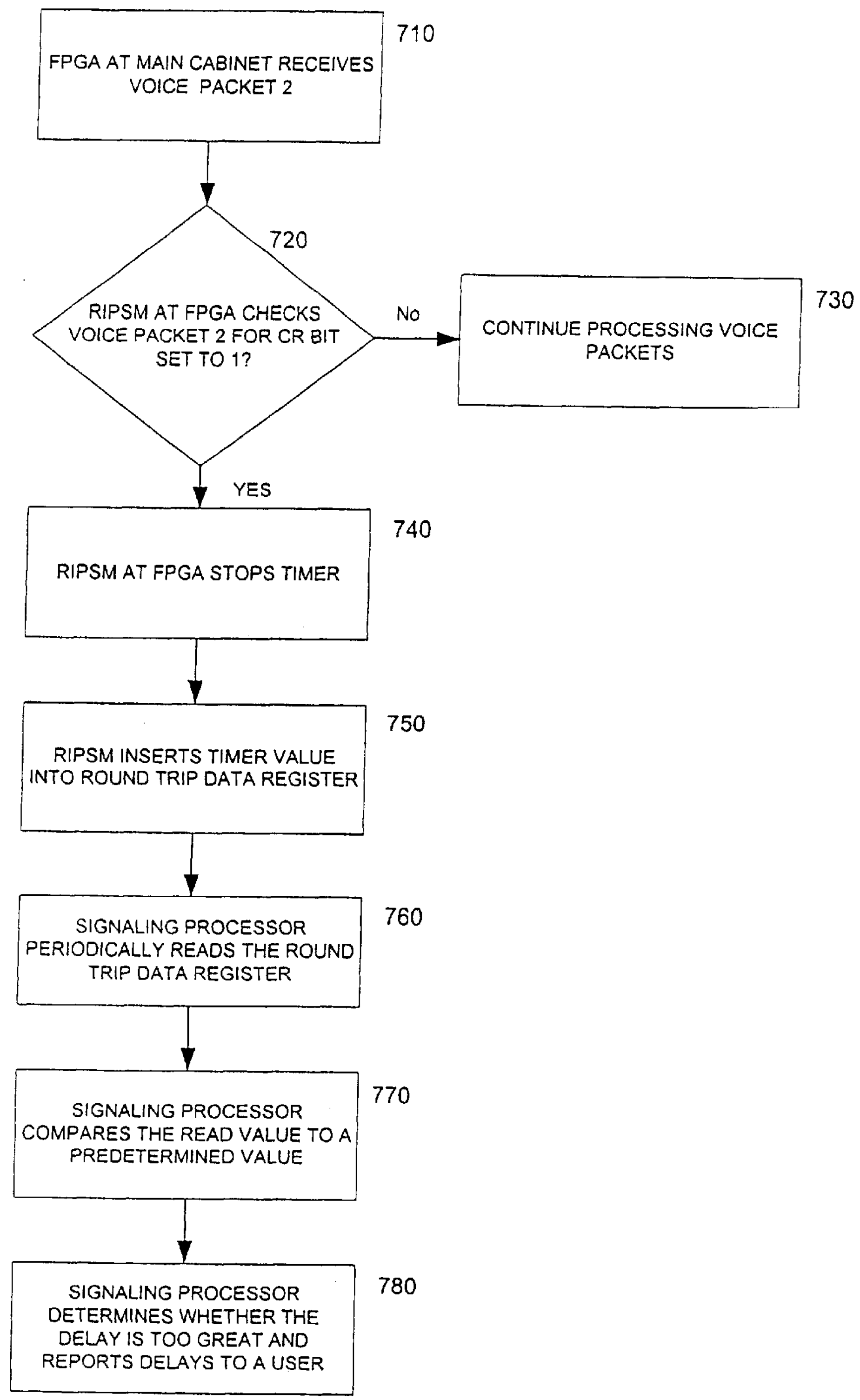
FIG. 7 shows the steps performed by the first cabinet to complete the process of timing the round trip delay of a voice packet consistent with the present invention.

FIGS. 5–7 are flow charts that illustrate the present invention using an example passage of telephone data between a main cabinet and a sub-cabinet.

FIG. 5 is a flow chart showing the steps 500 performed by main cabinet 100 and network 150 to send a voice packet to a sub-cabinet consistent with the present invention. The passage of signal data is handled in an industry standard manner.

Voice processor 302 receives voice samples from telephones 104 associated with main cabinet 100. Voice processor 302 transmits the voice samples to TIPSM 410 at FPGA 400 for forwarding to network 150 (step 510). TIPSM 410 receives the voice samples and builds voice packet 1 (step 520). TIPSM 410 sets the CT bit to 1 in voice packet 1 and starts timer 440 (step 530). TIPSM 410 forwards voice packet 1 to PISM 430 (step 540). PISM 430 transmits voice packet 1 to the physical interface 308 (step 550). Physical interface 308 forwards voice packet 1 to the network 150 in the form of voltage signals (step 560). Network 150 forwards voice packet 1 to the appropriate cabinet, in this example sub-cabinet 110 (step 570).

FIG. 6 shows the steps 600 performed by sub-cabinet 110 upon receiving voice packet 1.

Physical interface 318 at link 310 in sub-cabinet 110 forwards the received voice packet 1 to FPGA 450 (step 610). RIPSM 480 at FPGA 450 reviews the CT bit in voice packet 1 (step 620). RIPSM 480 determines if the CT flag is set (step 630), and if not, continues processing voice packets (step 640). If the CT bit is set, RIPSM 480 sets the CR bit to 1 in the next outgoing voice packet 2 in TIPSM 460 (step 650). Regardless of whether the CT bit is set, RIPSM 480 reformats the voice packet into PCM voice samples and passes them to voice processor 312 for forwarding to the appropriate telephone. TIPSM 460 outputs voice packet 2 to physical interface 318 for forwarding to the main cabinet 100 through the network 150 (step 660).

FIG. 7 shows the steps 700 performed by the main cabinet upon receiving voice packet 2 and the main signaling processor 301 in order to complete timing the delay of network 150. FPGA 400 at main cabinet 100 receives voice packet 2 (step 710). RIPSM 420 checks voice packet 2 to determine whether the CR bit is set to 1 (step 720). If not, the processing of voice packets continues (step 730). If the CR bit is set, RIPSM 420 stops timer 440 (step 740). RIPSM 420 latches the timer value into the round trip data register 445 (step 750). The round trip data register 445 always contains the most recent delay measurement. Main signaling processor 301, connected to FPGA 400, periodically reads the round trip data register 445 to read the stored value (step 760). Main signaling processor 301 compares the read value to a predetermined number to determine whether the network delay is too great (step 770). In one implementation, the predetermined value is 5 milliseconds, where delays greater than this are unacceptable. If the delay is unacceptable, a system administrator user is notified of the same via a terminal connected to the main signaling processor 301 (step 780). The signaling processors at each sub-cabinet read the round trip data register at the link it is connected to in order to determine if the delay is too great. The sub-cabinet signaling processors notify the main cabinet signaling processor of unacceptable delays for reporting to the user.

After the timer is read, the process begins again, with the RIPSM at the FPGA setting the CR bit in the next outgoing voice packet. Each link is simultaneously performing the function described, so that each link is measuring round trip delay of transmitting voice packets.

In another implementation, a subset of the links perform the task of measuring network delay.

FIGS. 5–7 show an example flow of voice packets to illustrate the invention. However, every cabinet in the system has the capabilities of performing the steps outlined. In one implementation, the only difference between the cabinets' capabilities and structure is that the main cabinet includes additional intelligence to direct all telephone calls and to report information to a system administrator.

In another implementation of the present invention, every RIPSM in every cabinet checks each incoming message for a set CR and/or CT bit.

In yet another implementation of the present invention, every TIPSM in every cabinet transmits each outgoing message for a set CR and/or CT bit.

In still another implementation of the present invention, the TIPSM and/or RIPSM have the capability to start and stop the timer and insert the timer value into the round trip data register.

In another implementation, the TIPSM in every cabinet sends out a voice packet every 125 microseconds while the system is in use. In this embodiment, the timer counts in units of 125 microseconds.

In another implementation, the FPGA device is a Xilinx XCV300 or a similar device having a dedicated block of RAM.

In another implementation the network is the internet.

In another implementation, the timer is used for holding the round trip data value and no separate round trip data register is required.

There are many variations that may be made consistent with the present invention. For example, the implementations above specifically mention voice packets, however, the present invention may be used with other kinds of data.

The foregoing description is presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

What is claimed is:

1. A system for use in a telephone network transmitting packets, the system comprising:

means for setting a transmit bit in an outgoing packet and for starting a timer at the setting of the transmit bit; and means for reading a receive bit in a received packet and for stopping the timer in response to the reading of a set receive bit in the received packet.

2. The system of claim 1 further comprising:

means for transmitting the outgoing packet.

3. The system of claim 1 further comprising:

means for reading a set transmit bit in the received packet; and means for setting a receive bit in the outgoing packet in response to the means for reading the set transmit bit in the received packet.

4. The system of claim 1 further comprising:

a round trip register; and means for inserting a value from the timer into the round trip register.

5. The system of claim 4 further comprising:

means for comparing the value in the round trip data register to a predetermined value; and means for sending a delay report to a user when the value in the round trip data register is greater than the predetermined value.

6. A field programmable gate array for use in a telephone system transmitting packets, the field programmable gate array comprising:

means for setting a transmit bit in an outgoing packet and for starting a timer at the setting of the transmit bit; and means for reading a receive bit in a received packet and for stopping the timer in response to the reading of a set receive bit in the received packet.

7. The field programmable gate array of claim 6 further comprising:

means for transmitting the outgoing packet.

8. The field programmable gate array of claim 6 further comprising:

means for reading a set transmit bit in the received packet; and means for setting a receive bit in the outgoing packet in response to the means for reading the set transmit bit in the received packet.

9. The field programmable array of claim 6 further comprising:

a round trip register; and means for inserting a value from the timer into the round trip register.

10. The field programmable array of claim 9 further comprising:

means for comparing the value in the round trip data register to a predetermined value; and means for sending a delay report to a user when the value in the round trip data register is greater than the predetermined value.

11. A system for use in timing the transmission of voice packets through a telephone network, said system comprising:

means for constructing an outgoing first voice packet;

means for setting a transmit bit in the first voice packet;

a timer; and means for starting the timer upon the setting of the transmit bit.

12. The system of claim 11 further comprising:

means for transmitting the first voice packet.

13. The system of claim 11 further comprising:

means for receiving a second voice packet;

means for checking the second voice packet to determine if a receive bit is set; and means for stopping the timer if the receive bit is set.

14. The system of claim 13 further comprising:

a round trip data register; and means for inserting a value from the timer into the round trip data register.

15. The system of claim 14 further comprising:

means for comparing the value in the round trip data register to a predetermined value; and means for sending a delay report to a user when the value in the round trip data register is greater than the predetermined value.

16. The system of claim 11, further comprising:

means for receiving a second voice packet;

means for checking the second voice packet to determine if the transmit bit is set;

means for constructing a third voice packet; and means for setting a receive bit in the third voice packet if the transmit bit is set.

17. The system of claim 16 further comprising:

means for transmitting the third voice packet.

18. A method for use in timing the transmission of voice packets through a telephone system, said method comprising the steps of:

constructing an outgoing first voice packet;

setting a transmit bit in the first voice packet; and starting a timer upon the setting of the transmit bit.

19. The method of claim 18 further comprising the step of:

transmitting the first voice packet.

20. The method of claim 18 further comprising the steps of:

receiving a second voice packet;

checking the second voice packet to determine if a receive bit is set; and stopping the timer if the receive bit is set.

21. The method of claim 20 further comprising the step of:

inserting a value from the timer into a round trip data register.

22. The method of claim 21 further comprising the steps of:

comparing the value in the round trip data register to a predetermined value; and sending a delay report to a user when the value in the round trip data register is greater than the predetermined value.

23. The method of claim 18, further comprising the steps of:

receiving a second voice packet;

checking the second voice packet to determine if the transmit bit is set;

constructing a third voice packet; and setting a receive bit in the third voice packet if the transmit bit is set.

24. The method of claim 23 further comprising the step of:

transmitting the third voice packet.

25. A system for use in a telephone system having telephone cabinets, each telephone cabinet having a link for linking the cabinet to a network, said system comprising:

a timer;

a transmitting protocol state machine comprising means for assembling a first voice packet from voice samples, said first voice packet including a receive bit and a transmit bit;

means for setting the transmit bit in the first voice packet;

means for starting the timer upon the setting of the transmit bit; and means for transmitting the first voice packet;

a receiving protocol state machine comprising means for receiving a second voice packet, said second voice packet including a receive bit and a transmit bit;

means for reading the receive bit and the transmit bit in the second voice packet;

means for setting the receive bit on the first voice packet assembled by the transmitting protocol state machine in response to reading a set transmit bit in the second voice packet; and means for stopping the timer in response to reading a set receive bit.

26. The system of claim 25 wherein the means for starting the timer further comprises:

means for starting the timer when transmitting the first voice packet.

27. The system of claim 25 further comprising:

a round trip data register, wherein the receiving protocol state machine further comprises means for inserting a value of the timer into the round trip data register.

28. The system of claim 25 wherein the means for assembling in the transmitting protocol state machine further comprises:

means for assembling a first voice packet from voice samples following an internet protocol.

29. The system of claim 25 wherein the receiving protocol state machine further comprises:

means for receiving voice packets that follow an internet protocol; and means for converting the voice packets into voice samples.

30. The system of claim 25 wherein the network is a local area network.

31. The system of claim 25 wherein the network is an internet.

32. A cabinet for use in a telephone network transmitting packets, the cabinet comprising:

a link for communicating with external devices, said link comprising means for setting a transmit bit in an outgoing packet and for starting a timer at the setting of the transmit bit; and means for reading a receive bit in a received packet and for stopping the timer in response to the reading of a set receive bit in the received packet; and means for connecting to a set of telephones.

33. The cabinet of claim 32 wherein the link further comprises:

means for transmitting the outgoing packet.

34. The cabinet of claim 32 wherein the link further comprises:

means for reading a set transmit bit in the received packet; and means for setting a receive bit in the outgoing packet in response to the means for reading the set transmit bit in the received packet.

35. The cabinet of claim 32 wherein the link further comprises:

a round trip register; and means for inserting a value from the timer into the round trip register.

36. The cabinet of claim 35 wherein the link further comprises:

means for comparing the value in the round trip data register to a predetermined value; and means for sending a delay report to a user when the value in the round trip data register is greater than the predetermined value.

* * * * *